(12) United States Patent
Scott (10) Patent No.: US 12,273,659 B2
(45) Date of Patent: Apr. 8, 2025

(54) DETECTION DEVICE FOR DETECTING POTENTIALLY HAZARDOUS APPROACHING OBJECTS

(71) Applicant: Maurice Scott, San Gabriel, CA (US)

(72) Inventor: Maurice Scott, San Gabriel, CA (US)

( * ) Notice: Subject to any disclaimer, the term of this patent is extended or adjusted under 35 U.S.C. 154(b) by 192 days.

(21) Appl. No.: 18/104,887

(22) Filed: Feb. 2, 2023

(65) Prior Publication Data

US 2024/0267490 A1    Aug. 8, 2024

(51) Int. Cl.
| | |
|---|---|
| *H04N 7/18* | (2006.01) |
| *G06V 10/143* | (2022.01) |
| *G06V 20/52* | (2022.01) |
| *G08B 13/196* | (2006.01) |
| *H04N 23/13* | (2023.01) |
| *H04N 23/21* | (2023.01) |
| *H04N 23/23* | (2023.01) |
| *H04N 23/695* | (2023.01) |

(52) U.S. Cl.
CPC ........... *H04N 7/181* (2013.01); *G06V 10/143* (2022.01); *G06V 20/52* (2022.01); *G08B 13/1963* (2013.01); *H04N 23/13* (2023.01); *H04N 23/695* (2023.01); *H04N 23/21* (2023.01); *H04N 23/23* (2023.01)

(58) Field of Classification Search
CPC ...... H04N 7/181; H04N 23/13; H04N 23/695; H04N 23/21; H04N 23/23; G06V 10/143; G06V 20/52; G08B 13/1963
See application file for complete search history.

(56) References Cited

U.S. PATENT DOCUMENTS

| | | | |
|---|---|---|---|
| D449,630 S | 10/2001 | Rak | |
| 6,354,749 B1* | 3/2002 | Pfaffenberger, II | ......................... G08B 13/19632 396/428 |
| 7,697,028 B1* | 4/2010 | Johnson | ................ B60R 25/305 348/148 |
| 8,228,177 B1 | 7/2012 | Yamada | |
| 10,717,410 B2 | 7/2020 | Ciuperger | |
| 11,348,269 B1* | 5/2022 | Ebrahimi Afrouzi | ... G01S 17/48 |
| 11,433,855 B2 | 9/2022 | Bielby | |
| 12,067,853 B1* | 8/2024 | Hamdan | .......... G08B 13/19695 |
| 2005/0140785 A1* | 6/2005 | Mazzilli | .......... G08B 13/19619 348/148 |
| 2006/0050150 A1* | 3/2006 | Yamane | ............. G08B 13/1963 348/151 |
| 2009/0251530 A1* | 10/2009 | Cilia | ..................... G07C 5/0866 348/E7.001 |
| 2014/0178031 A1* | 6/2014 | Walker | ..................... G08G 1/20 386/227 |
| 2018/0054573 A1* | 2/2018 | Handley | ................ H04N 7/183 |

(Continued)

FOREIGN PATENT DOCUMENTS

WO    WO2014137242    9/2014

*Primary Examiner* — Fernando Alcon (57) ABSTRACT

A detection device for detecting approaching hazards includes a housing with a camera assembly that is positioned to face outwardly of the housing. A control circuit is electrically coupled to the camera assembly. The control circuit is programmed to identify objects that are approaching the detection device based on a video stream generated by the camera assembly. The control circuit activates a transmitter to transmit an alert signal to a personal electronic device when an object approaching the detection device is detected.

14 Claims, 6 Drawing Sheets

(56) References Cited

U.S. PATENT DOCUMENTS

| | | | |
|---|---|---|---|
| 2018/0098201 A1* | 4/2018 | Torello | H02J 13/00028 |
| 2018/0109703 A1* | 4/2018 | Steffanson | H04N 23/51 |
| 2018/0229669 A1 | 8/2018 | McKibben | |
| 2019/0283711 A1 | 9/2019 | Moran | |
| 2019/0318556 A1 | 10/2019 | Kintner | |
| 2020/0294164 A1* | 9/2020 | Redmon | G06Q 30/0185 |
| 2021/0278257 A1* | 9/2021 | Dharia | G06V 20/56 |
| 2021/0280028 A1* | 9/2021 | Levy | G06V 40/173 |
| 2021/0383688 A1* | 12/2021 | Chen | G06V 10/764 |
| 2022/0094889 A1* | 3/2022 | Lee | H04N 9/3194 |
| 2022/0122431 A1* | 4/2022 | Barton | G06T 7/80 |
| 2022/0368556 A1* | 11/2022 | Scalisi | H04N 23/661 |
| 2022/0402435 A1* | 12/2022 | Saville | G06F 3/0488 |
| 2023/0219582 A1* | 7/2023 | Diehl | G01S 17/931 |
| | | | 701/1 |

* cited by examiner

DETECTION DEVICE FOR DETECTING POTENTIALLY HAZARDOUS APPROACHING OBJECTS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to detection devices and more particularly pertains to a new detection device for detecting approaching hazards.

(2) Description of Related Art Including Information Disclosed Under 37 CFR 1.97 and 1.98

The prior art relates to detection devices for detecting an approaching hazard to an automobile. U.S. Pat. No. 11,433,855, for example, discloses a threat alerting system for vehicles that includes a camera for monitoring the vehicle's surroundings. The camera in this patent captures still images and transmits them along with an alert signal to a mobile device when an analysis of the still images identifies a person attempting to break into or damage the vehicle. U.S. Pat. Application 2019/0283711 discloses a detection and warning system for vehicles which uses cameras to capture images of a person approaching a vehicle. However, the prior art fails to disclose a detection device which has a camera for generating video streams which analyzes the video streams for an object approaching the detection device, and which transmits the video streams and an alert signal to a personal electronic device when such an object is detected.

BRIEF SUMMARY OF THE INVENTION

An embodiment of the disclosure meets the needs presented above by generally comprising a housing comprising a bottom wall, a top wall, and a perimeter wall, in which the perimeter wall extends between the bottom wall and the top wall. The housing defines an interior space which is bounded by the bottom wall, the top wall, and the perimeter wall. A control circuit is coupled to the housing and is positioned within the interior space. A camera assembly is coupled to the housing and electrically coupled to the control circuit. The camera assembly is positioned to face outwardly of the housing, and the control circuit is programmed to selectively activate the camera assembly to generate a video stream. The control circuit is programmed such that it is configured for identifying from the video stream an object that is approaching the detection device. A transmitter is electrically coupled to the control circuit, which is programmed such that the control circuit is configured for selectively activating the transmitter to transmit the video stream to a personal electronic device. The control circuit is also programmed such that the control circuit is configured for selectively activating the transmitter to transmit an alert signal to the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new detection device embodying the principles and concepts of an embodiment of the disclosure and generally designated by the reference numeral 10 will be described.

As best illustrated in FIGS. 1 through 6, the detection device 10 generally comprises a housing 12 comprising a bottom wall 14, a top wall 16, and a perimeter wall 18, where the perimeter wall 18 extends between the bottom wall 14 and the top wall 16. The housing 12 defines an interior space 20 bounded by the bottom wall 14, the top wall 16, and the perimeter wall 18. The perimeter wall 18 is translucent. In the detailed description and in the claims, "translucent" describes an optical property wherein light is allowed to pass through the translucent material without appreciable scattering such that objects are viewable and discernable through the translucent material. "Translucent" materials therefore include transparent materials. The perimeter wall 18 is also cylindrical. A control circuit 22 is coupled to the housing 12 and is positioned within the interior space 20. The housing 12 has a lower divider wall 24 positioned within the interior space 20 such that the lower divider wall 24 and the bottom wall 14 define a lower compartment 26, and the control circuit 22 is positioned within the lower compartment 26.

A camera assembly 28 is coupled to the housing 12 and electrically coupled to the control circuit 22. The camera assembly 28 is positioned within the interior space 20 and is positioned to face outwardly of the housing 12 through the perimeter wall 18. The camera assembly 28 comprises a visible light camera 30 for generating videos from light in a visible light spectrum, an infrared camera 32 for generating videos from light in a near-infrared spectrum, and a thermal camera 34 for generating videos from light in a far-infrared spectrum. The visible light spectrum includes electromagnetic waves with wavelengths between 380 nanometers and 750 nanometers. The infrared camera 32 utilizes conventional means of improving visibility of viewed objects in low-light conditions by converting electromagnetic waves in the near-infrared spectrum into images within the visible spectrum of light. The near-infrared spectrum includes electromagnetic waves with wavelengths between 750 nanometers and 1,400 nanometers. The thermal camera 34 utilizes conventional means to visualize thermal emissions generated by viewed objects by converting electromagnetic waves in the far-infrared spectrum into images within the visible spectrum of light. The far-infrared spectrum includes waves with wavelengths between 8,000 nanometers and 15,000 nanometers. Objects with different thermal emission patterns may then be identified by analyzing the thermal emission visualizations generated by the thermal camera 34.

The control circuit 22 is programmed to selectively activate the camera assembly 28 to generate a video stream. The control circuit 22 has a memory 36, where the control circuit 22 is programmed to selectively store the video stream. The control circuit 22 is programmed such that it is configured for identifying from the video stream an object that is approaching the detection device 10. The control circuit 22 may be programmed to identify at least one of a human 38, an animal, and a motor vehicle approaching the detection device 10. For example, the control circuit 22 may be programmed to recognize visual features of the human 38 based on visible and near-infrared light and to recognize thermal emission patterns consistent with the human 38.

The camera assembly 28 is rotatable around a rotational axis which is oriented vertically. A motor 40 is coupled to the camera assembly 28 for selectively rotating the camera assembly 28 with respect to the housing 12 around the rotational axis. The camera assembly 28 is positioned above the lower divider wall 24, and the motor 40 is positioned to extend from the lower compartment 26 upwardly through the divider wall to the camera assembly 28. The motor 40 is electrically coupled to the control circuit 22 which is programmed to activate the motor 40 to move the camera assembly 28 in a selected movement pattern. The motor 40 may, for example, be activated to move the camera assembly 28 in a first movement pattern in which the camera assembly 28 continuously rotates in a rotational direction around the rotational axis. The motor 40 may also be activated to move the camera assembly 28 in a second movement pattern in which the camera assembly 28 pivots back and forth between two positions. The motor 40 may also be activated to move the camera assembly 28 in a third movement pattern in which the camera assembly 28 is stationary. A user may determine the selected movement pattern, or the selected movement pattern may be programmed into the control circuit 22.

A transmitter 42 is electrically coupled to the control circuit 22. The control circuit 22 is programmed such that the control circuit 22 is configured for selectively activating the transmitter 42 to transmit the video stream to a personal electronic device 44, such as a cell phone 46. The control circuit 22 is also programmed such that the control circuit 22 is configured for selectively activating the transmitter 42 to transmit an alert signal to the personal electronic device 44.

A power supply 48 is electrically coupled to the control circuit 22. The power supply 48 is coupled to the housing 12 and is positioned in the interior space 20. The housing 12 has an upper divider wall 50 positioned within the interior space 20 such that the upper divider wall 50 and the top wall 16 define an upper compartment 52, and the power supply 48 is positioned within the upper compartment 52. The power supply 48 is a battery 54. A solar panel 56 is electrically coupled to the battery 54 and is coupled to a top side 58 of the housing 12. A magnet 60 is coupled to a bottom side 62 of the housing 12 for magnetically adhering to a support surface 64.

Figure 1:
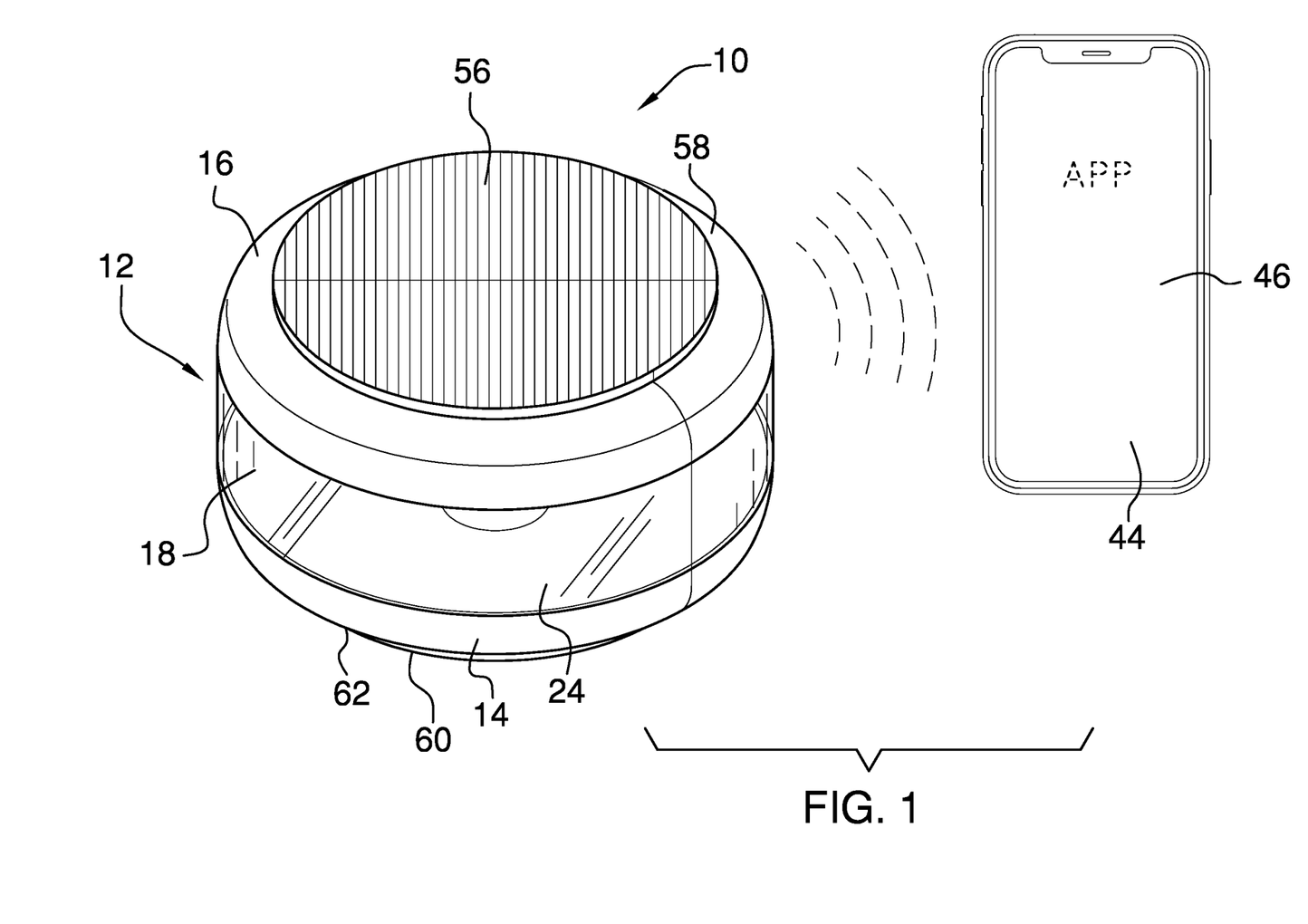
FIG. 1 is a top front perspective view of a detection device according to an embodiment of the disclosure.
Figure 2:
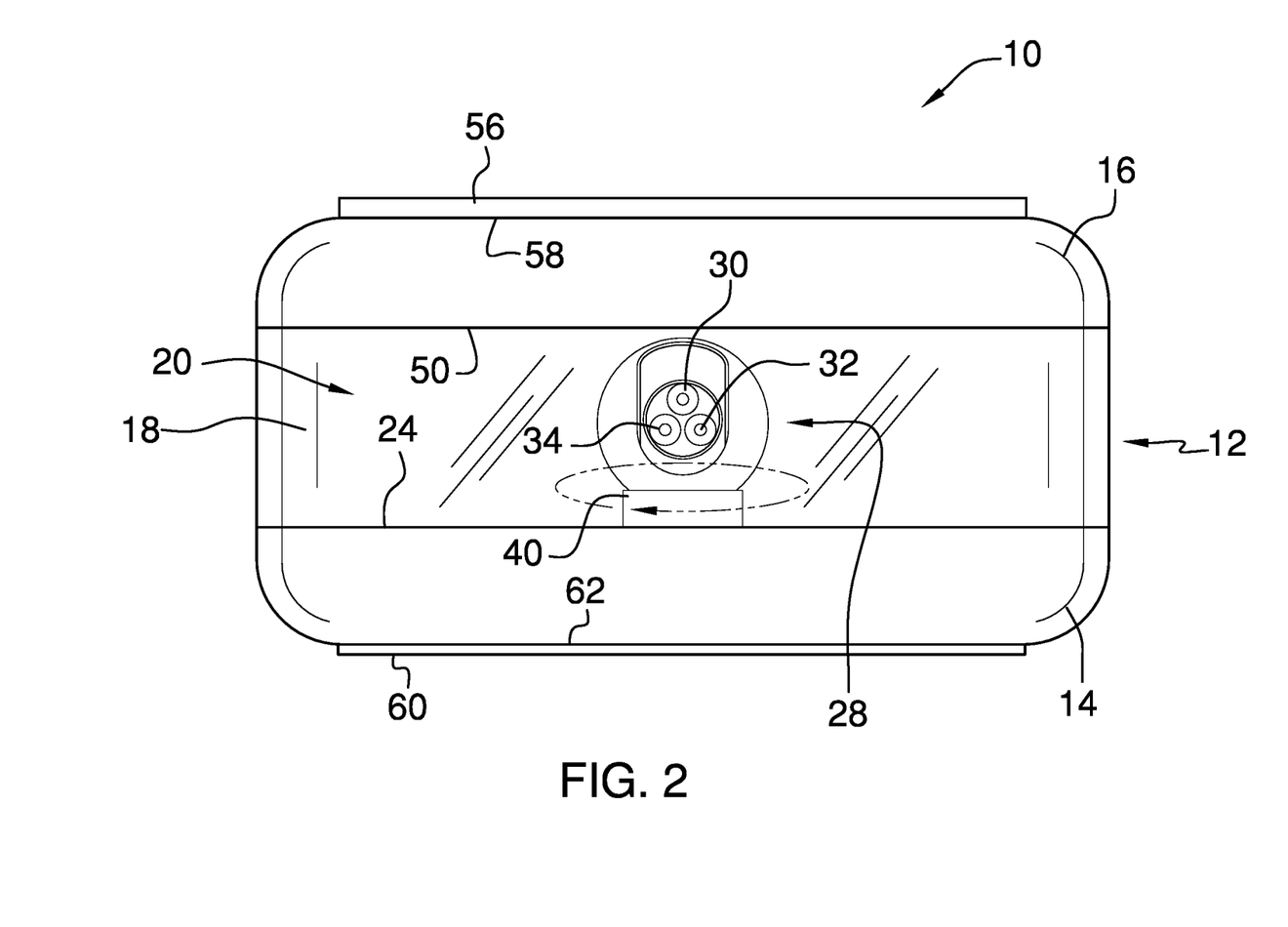
FIG. 2 is a front view of an embodiment of the disclosure.
Figure 3:
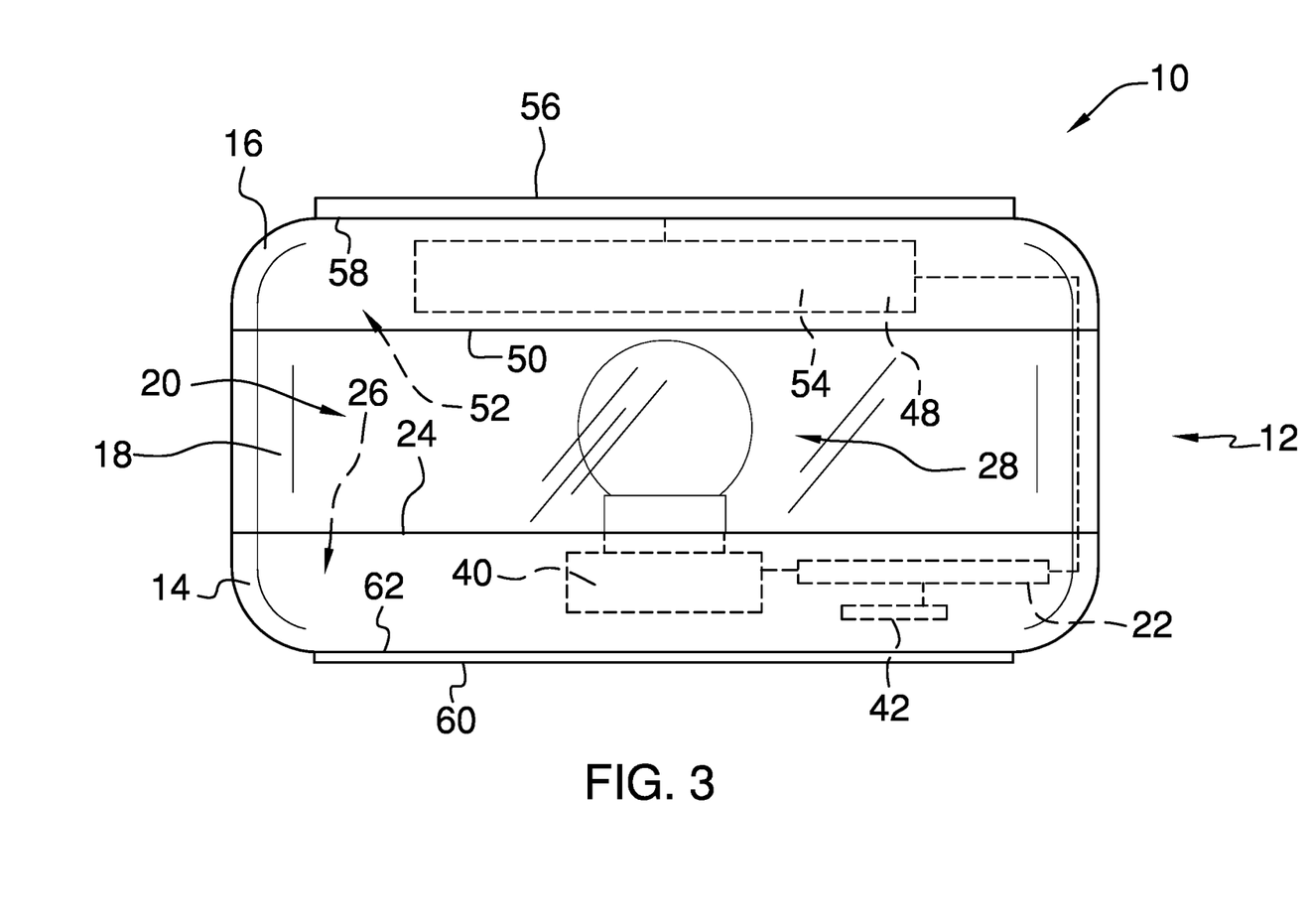
FIG. 3 is a back view of an embodiment of the disclosure.
Figure 4:
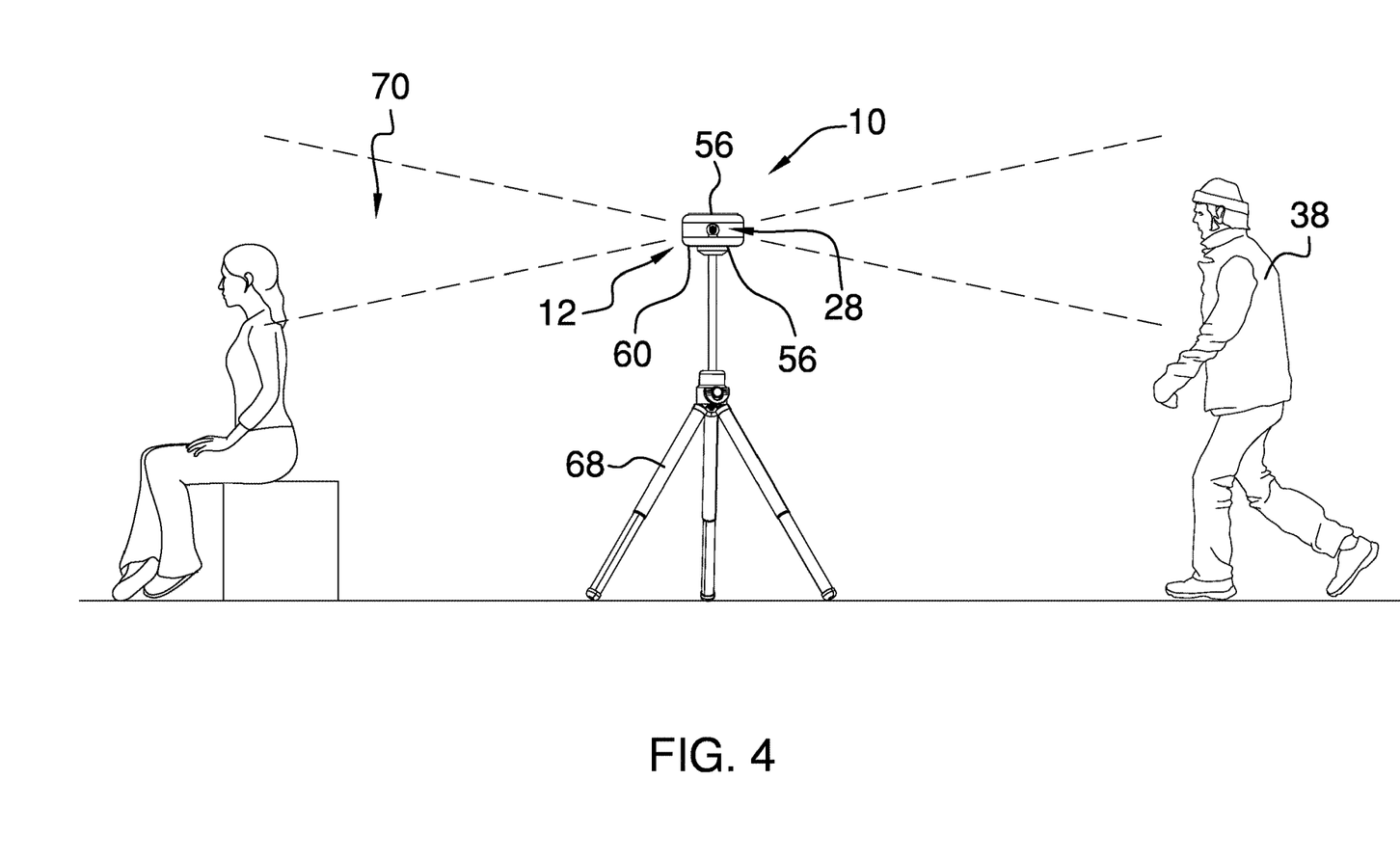
FIG. 4 is an in-use view of an embodiment of the disclosure.
Figure 5:
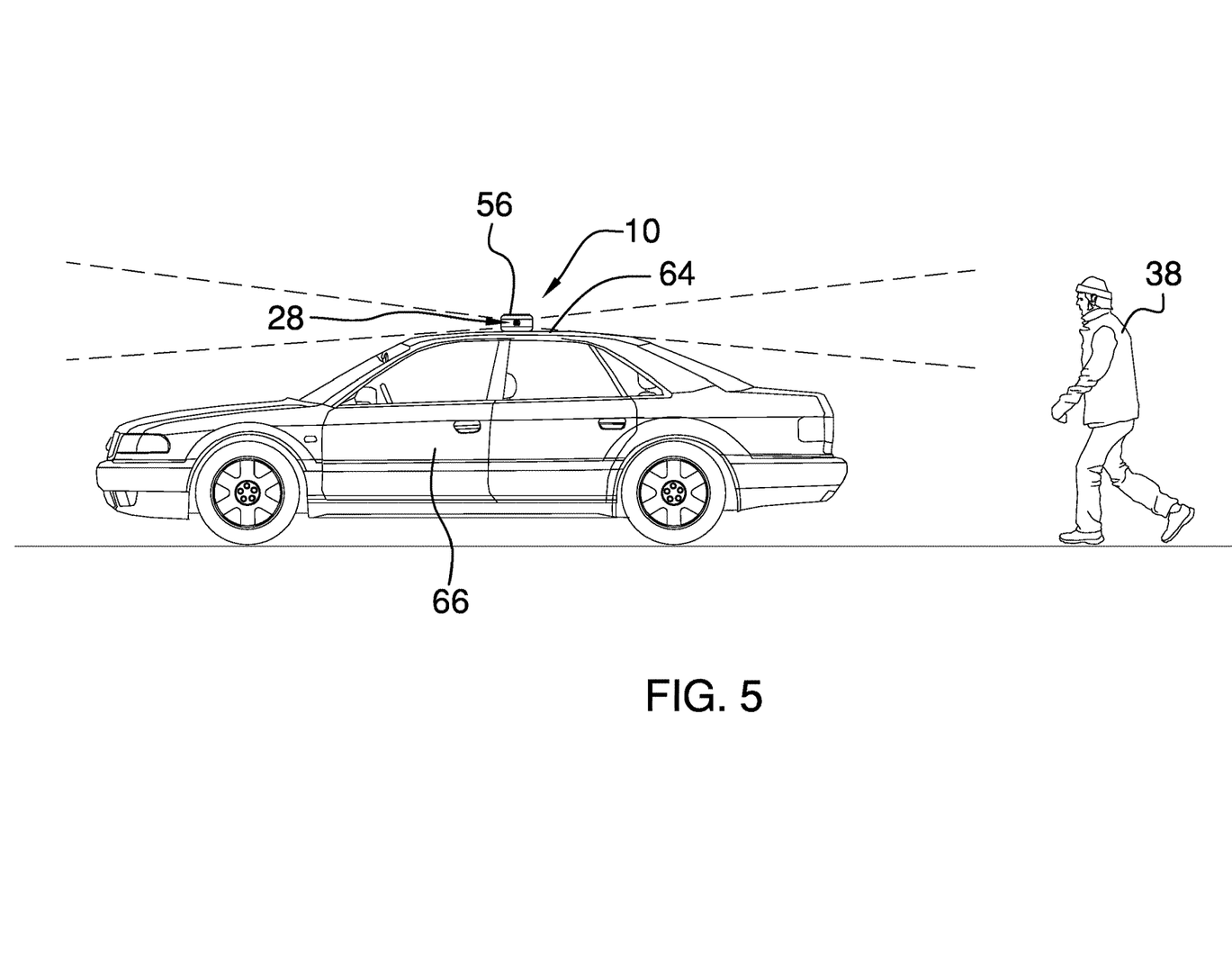
FIG. 5 is an in-use view of an embodiment of the disclosure.
Figure 6:
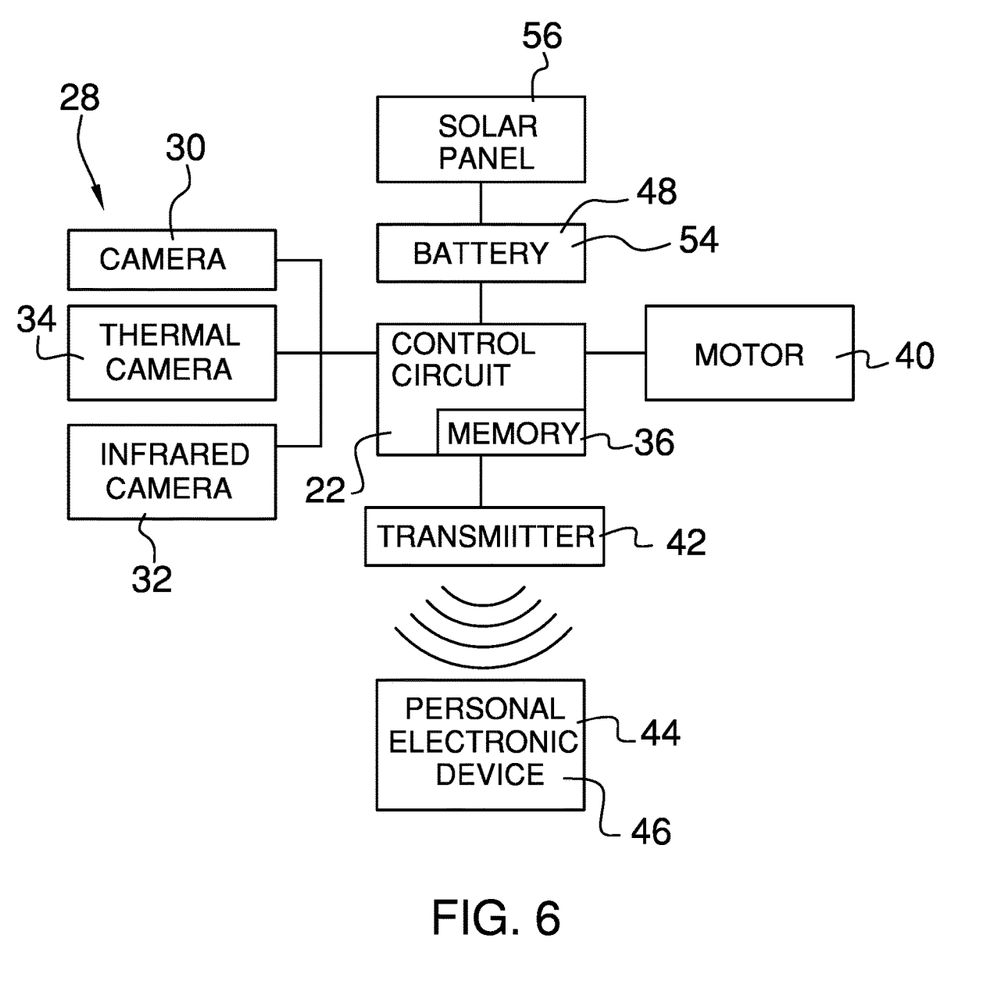
FIG. 6 is a block diagram of an embodiment of the disclosure.

In use, the detection device 10 is positioned on the support surface 64 and activated to watch for approaching objects. The detection device 10 may, for example, be positioned on an automobile 66 to detect approaching hazards to the automobile 66. The detection device 10 may also be positioned on a tripod 68, desk, shelf, table, or the like for detecting potential hazards such as an intruder approaching a personal space 70 where the detection device 10 is placed. If the support surface 64 is magnetic, the magnet 60 will also magnetically adhere to the support surface 64. If the detection device 10 detects an object approaching the detection device 10, the detection device 10 will transmit the alert signal to the personal electronic device 44 to warn the user of a potential hazard.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A detection device for detecting approaching objects, the device comprising:

a housing comprising a bottom wall, a top wall, and a perimeter wall, said perimeter wall extending between said bottom wall and said top wall, said housing defining an interior space, wherein said perimeter wall is cylindrical and extends perpendicularly from said bottom wall;

a control circuit being coupled to said housing and being positioned within said interior space;

a camera assembly being coupled to said housing and electrically coupled to said control circuit, said camera assembly being positioned to face outwardly of said housing, said control circuit being programmed to selectively activate said camera assembly to generate a video stream, said control circuit being programmed such that it is configured for identifying from said video stream an object that is approaching said detection device; and a transmitter being electrically coupled to said control circuit, said control circuit being programmed such that said control circuit is configured for selectively activating said transmitter to transmit said video stream to a personal electronic device, said control circuit being programmed such that said control circuit is configured for selectively activating said transmitter to transmit an alert signal to the personal electronic device; and wherein said camera assembly is positioned within said interior space, said camera assembly being positioned to face outwardly of said housing perpendicularly through said perimeter wall, said perimeter wall being translucent.

2. The device of claim 1, wherein said housing has a lower divider wall positioned within said interior space such that said lower divider wall and said bottom wall define a lower compartment, said control circuit being positioned within said lower compartment.

3. The device of claim 1, wherein said camera assembly comprises a visible light camera for generating videos from light in a visible light spectrum, an infrared camera for generating videos from light in a near-infrared spectrum, and a thermal camera for generating videos from light in a far-infrared spectrum.

4. The device of claim 1, wherein said control circuit has a memory, said control circuit being programmed to selectively store said video stream on said memory.

5. The device of claim 1, wherein said camera assembly is rotatable around a rotational axis, said rotational axis being oriented vertically.

6. The device of claim 5, further comprising a motor being coupled to said camera assembly for selectively rotating said camera assembly with respect to said housing around said rotational axis, said motor being electrically coupled to said control circuit, said control circuit being programmed to activate said motor to move said camera assembly in a selected movement pattern.

7. The device of claim 2, wherein said camera assembly is rotatable around a rotational axis, said rotational axis being oriented vertically, said camera assembly being positioned above said lower divider wall, said device further comprising a motor being coupled to said camera assembly for selectively rotating said camera assembly with respect to said housing around said rotational axis, said motor being electrically coupled to said control circuit, said control circuit being programmed to activate said motor to move said camera assembly in a selected movement pattern, said motor being positioned in said lower compartment and extending upwardly through said lower divider wall.

8. The device of claim 1, wherein said control circuit being programmed such that it is configured for identifying from said video stream at least one of a human, an animal, and a motor vehicle that is approaching said detection device.

9. The device of claim 1, further comprising a power supply being electrically coupled to said control circuit, said power supply being coupled to said housing and being positioned in said interior space.

10. The device of claim 9, wherein said housing has an upper divider wall positioned within said interior space such that said upper divider wall and said top wall define an upper compartment, said power supply being positioned within said upper compartment.

11. The device of claim 10, wherein said power supply is a battery.

12. The device of claim 11, further comprising a solar panel being electrically coupled to said battery, said solar panel being coupled to a top side of said housing.

13. The device of claim 1, further comprising a magnet being coupled to a bottom side of said housing for magnetically adhering to a support surface.

14. A detection device for detecting approaching objects, the device comprising:

a housing comprising a bottom wall, a top wall, and a perimeter wall, said perimeter wall extending between said bottom wall and said top wall, said housing defining an interior space, said perimeter wall being translucent, said perimeter wall being cylindrical and extending perpendicularly from said bottom wall;

a control circuit being coupled to said housing and being positioned within said interior space, said housing having a lower divider wall positioned within said interior space such that said lower divider wall and said bottom wall define a lower compartment, said control circuit being positioned within said lower compartment;

a camera assembly being coupled to said housing and electrically coupled to said control circuit, said camera assembly being positioned within said interior space, said camera assembly being positioned to face outwardly of said housing perpendicularly through said perimeter wall, said camera assembly comprising a visible light camera for generating videos from light in a visible light spectrum, an infrared camera for generating videos from light in a near-infrared spectrum, and a thermal camera for generating videos from light in a far-infrared spectrum, said control circuit being programmed to selectively activate said camera assembly to generate a video stream, said control circuit having a memory, said control circuit being programmed to selectively store said video stream on said memory, said control circuit being programmed such that it is configured for identifying from said video stream at least one of a human, an animal, and a motor vehicle that is approaching said detection device, said camera assembly being rotatable around a rotational axis, said rotational axis being oriented vertically, said camera assembly being positioned above said lower divider wall;

a motor being coupled to said camera assembly for selectively rotating said camera assembly with respect to said housing around said rotational axis, said motor being electrically coupled to said control circuit, said control circuit being programmed to activate said motor to move said camera assembly in a selected movement pattern, said motor being positioned in said lower compartment and extending upwardly through said lower divider wall;

a transmitter being electrically coupled to said control circuit, said control circuit being programmed such that said control circuit is configured for selectively activating said transmitter to transmit said video stream to a personal electronic device, said control circuit being programmed such that said control circuit is configured for selectively activating said transmitter to transmit an alert signal to the personal electronic device;

a power supply being electrically coupled to said control circuit, said power supply being coupled to said housing and being positioned in said interior space, said housing having an upper divider wall positioned within said interior space such that said upper divider wall and said top wall define an upper compartment, said power supply being positioned within said upper compartment, said power supply being a battery;

a solar panel being electrically coupled to said battery, said solar panel being coupled to a top side of said housing; and a magnet being coupled to a bottom side of said housing for magnetically adhering to a support surface.

* * * * *